United States Patent [19]

Monin

[11] Patent Number: 5,496,145
[45] Date of Patent: Mar. 5, 1996

[54] COMBINATION ROUND BALE FEEDER

[75] Inventor: Joseph E. Monin, Bardstown, Ky.

[73] Assignee: Agri-Supply Mfg., Inc., Bardstown, Ky.

[21] Appl. No.: 349,655

[22] Filed: Dec. 5, 1994

[51] Int. Cl.⁶ .................................................. A01K 1/10
[52] U.S. Cl. ........................ 414/24.5; 119/59; 119/60
[58] Field of Search ..................... 414/24.5; 296/6; 119/58, 59, 60; 410/2

[56] References Cited

U.S. PATENT DOCUMENTS

| | | |
|---|---|---|
| 42,927 | 5/1864 | Close . |
| 329,500 | 11/1885 | Streator ..................... 119/59 |
| 3,824,962 | 7/1974 | Topham . |
| 3,890,433 | 6/1975 | Boehm ..................... 119/60 |
| 3,972,308 | 8/1976 | Roy ..................... 414/24.5 |
| 4,020,794 | 5/1977 | Nethery . |
| 4,258,663 | 3/1981 | Schoessow . |
| 4,285,300 | 8/1981 | Spane . |
| 5,067,442 | 11/1991 | Schilling . |
| 5,076,752 | 12/1991 | Rader ..................... 414/24.5 |
| 5,158,040 | 10/1992 | Martin . |
| 5,311,840 | 5/1994 | Rumbaugh . |
| 5,337,699 | 8/1994 | Dyson ..................... 119/60 |
| 5,386,800 | 2/1995 | Pirok ..................... 119/60 |

FOREIGN PATENT DOCUMENTS

| | | | |
|---|---|---|---|
| 2598281 | 11/1987 | France ..................... 119/60 |
| 2154418 | 9/1985 | United Kingdom . | |

*Primary Examiner*—Michael S. Huppert
*Assistant Examiner*—Gregory A. Morse
*Attorney, Agent, or Firm*—King and Schickli

[57] ABSTRACT

A combination round bale feeder includes tubular U-shaped ribs arranged to form a cradle framework. The cylindrical shape of the feeder keeps the enclosed hay bale or other forage centered, while the spacing of frame members allows controlled access to all of the enclosed forage. A removable gate is provided at the rear of the feeder to permit easy loading and includes brackets to allow the gate to be hung on the side of the feeder during loading. A removable plastic floor sheet is also provided that converts the feeder into a trough for supplemental feed. A mounting platform with skid pipes elevates the framework above the ground and allows the feeder to be pushed or pulled to different locations. The compact construction of the feeder also allows for convenient transport in the bed of a pickup truck as well as manual handling by as few as two persons.

12 Claims, 2 Drawing Sheets

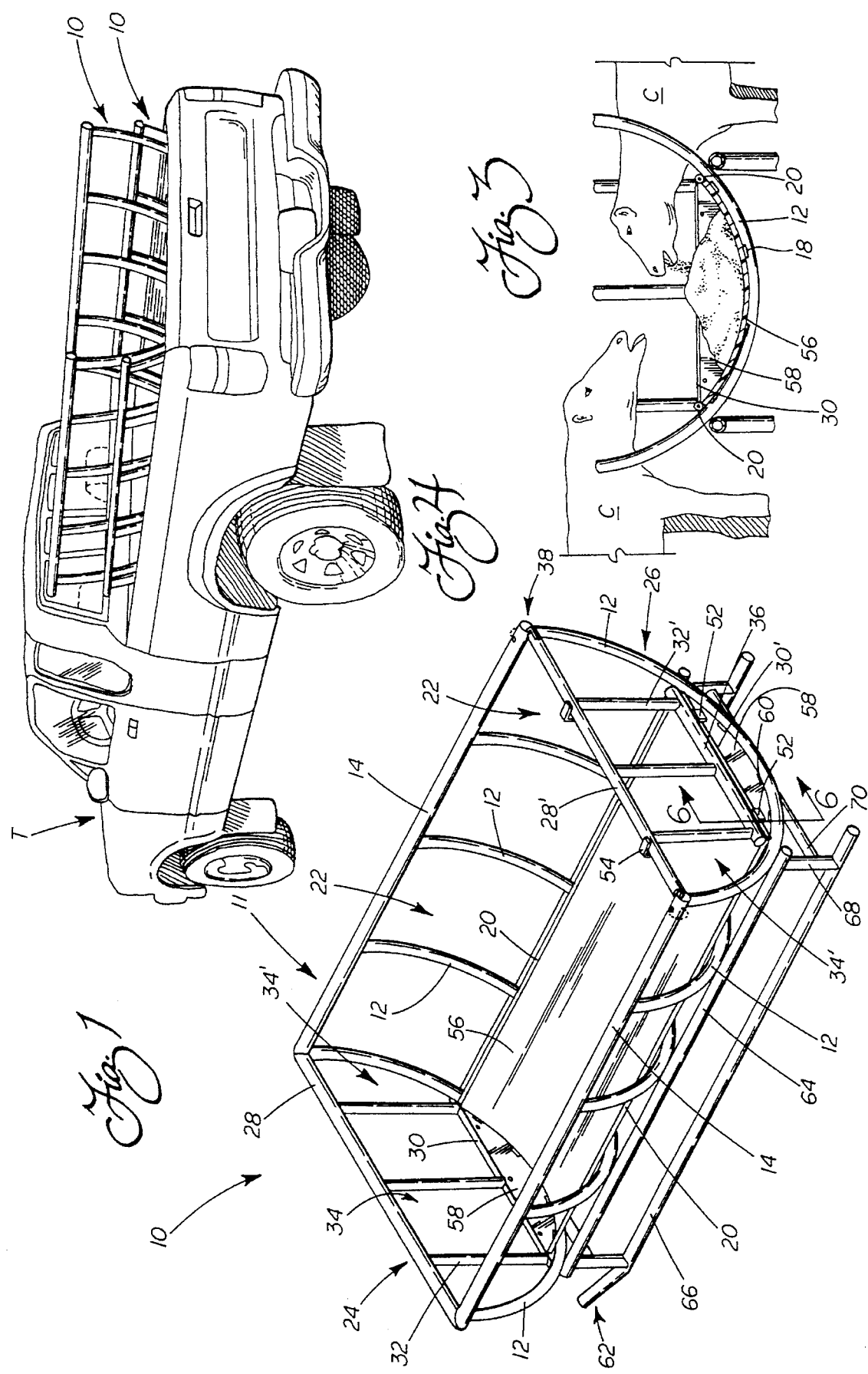

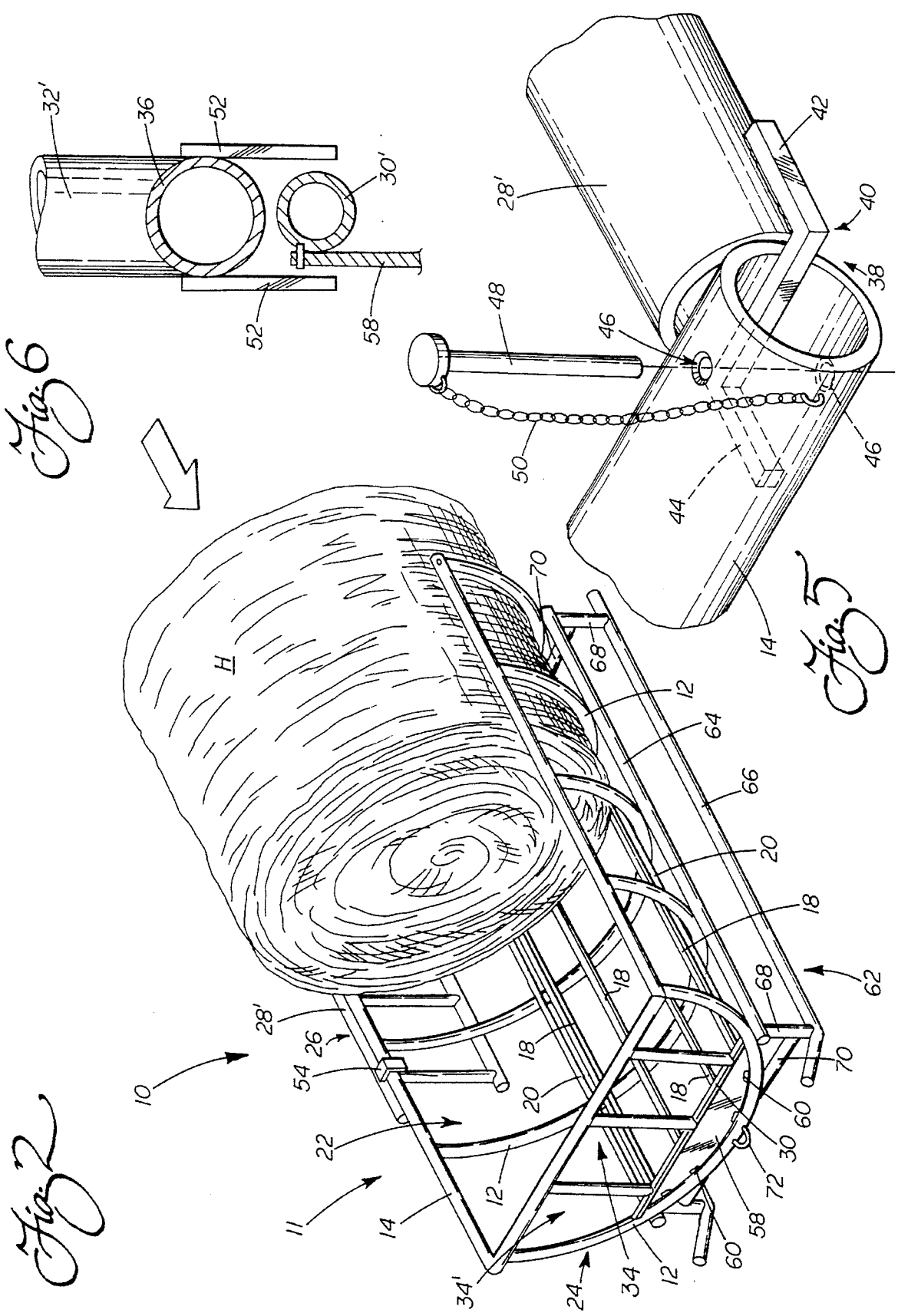

COMBINATION ROUND BALE FEEDER

TECHNICAL FIELD

The present invention relates generally to a portable livestock feeder; and more particularly, to an improved combination round bale feeder having a single frame design that includes a removable floor sheet for converting the feeder to a trough, and a removable gate for loading.

BACKGROUND OF THE INVENTION

Livestock feeders are commonly used in ranching operations to supply hay bales and other forage to cattle when grazing becomes unavailable. As the need for such supplemental feeding varies with the season, feeders are continually being moved into and taken out of storage over the course of a year. Also, while in the field, a feeder may be needed in various locations, so the feeder must be moved from site to site. Consequently, the portability of a livestock feeder is an important quality.

It is also desirable to periodically feed cattle finer material such as mineral or grain feed that requires a feeding trough. Hay feeders that also function as feeding troughs thus eliminate the need for a separate trough. Other desirable features in livestock feeders include convenient loading and unloading of feed, allowing the livestock total access to all of the enclosed feed and elevating the feed above the unsanitary ground conditions.

In response to these various feeding demands, two main groups of livestock feeders have been developed: double frame and single frame designs. An example of a recent double frame feeder is U.S. Pat. No. 5,311,840 to Rumbaugh, which teaches the use of separate inner and outer frames. The inner frame is U-shaped and functions as the support structure for the round hay bale. The surrounding outer frame is rectangular and functions as the limiting interface between the cattle and the enclosed feed.

While the outer frame of this feeder retains hay that falls from the inner frame, it also prevents the cattle from reaching feed in the middle of the inner frame. It follows that only partial consumption of the enclosed feed is possible. Additionally, the use of two separate frames for the support and interface functions adds substantial weight to this feeder, making it more difficult and cumbersome to transport.

A similar double framework feeder having inner and outer frames is U.S. Pat. No. 5,158,040 to Martin. This feeder includes permanently mounted floor boards and small side walls that form a trough. Along with the separate inner and outer frames of this design, the fixed floor boards and side walls add even more weight to this feeder and also collect dirt and contaminants that must be continually removed and/or washed out. Further, the continuous outer framework provides no lateral access to the inner bale-supporting frame; thus, loading may be accomplished only by lifting and lowering the bale into the inner frame, thereby requiring special bale handling apparatus.

Prior art single frame feeders generally provide better cattle access to the enclosed feed. An example of a single frame feeder is U.S. Pat. No. 5,067,442 to Schilling. This patent discloses a collapsible frame feeder in which opposing sides of the feeder move toward each other as the enclosed hay is consumed. One of the main drawbacks to this design is that the hay bale sits directly on the ground and thus quickly becomes soiled with mud, manure, and other contaminants, thereby resulting in wastage.

Another single frame feeder design is taught in U.S. Pat. No. 4,285,300 to Spane. This patent discloses a U-shaped manger-like feeder that is permanently attached to an elevated structure at a feeding station. As this feeder must be suspended from a separate structure, it cannot be readily moved or used at remote locations. Additionally, this design is not capable of functioning as a trough.

Although the numerous designs of prior art feeders embody many desirable features, a need remains for a single frame feeder that both functions as a support structure for the feed and forms a direct interface between the cattle and the feed, and includes improved portability, trough feeding capability, lateral bale loading and complete access to all of the enclosed feed.

SUMMARY OF INVENTION

Accordingly, it is a primary object of the present invention to provide an improved combination livestock feeder having features that are designed to overcome the limitations of the prior art.

Another object of the present invention is to provide a livestock feeder having a single U-shaped cradle that both supports the enclosed bale/feed and defines the direct interface with the feeding cattle.

It is another object of the present invention to provide a livestock feeder having a U-shaped cradle that conforms to the curvature of a round hay bale to keep the bale centered as it is being consumed, and allows complete cattle access to all of the enclosed feed.

It is yet another object of the present invention to provide a livestock feeder having a removable gate that allows for lateral loading and can be secured to the feeder frame during loading.

It is still another object of the present invention to provide a livestock feeder having a removable floor that converts the feeder into a feeding trough and can be easily removed for convenient cleaning.

It is still another object of the present invention to provide a livestock feeder having an overall light-weight and compact construction for enhanced mobility.

It is yet another object of the present invention to provide a livestock feeder having a mounting platform that elevates the enclosed feed above unsanitary ground conditions and is configured to permit the feeder to conveniently fit in the bed of a pickup truck for convenient transportation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

BRIEF DESCRIPTION OF THE INVENTION

To achieve the foregoing and other objects, an improved combination livestock feeder is provided for supplying both round hay bales and granular forage to livestock. The feeder embodies a single structure and includes a series of tubular U-shaped ribs that form a cradle framework and end frame means that enclose the framework. The U-shaped ribs and vertical bars of the end frame means are spaced apart to define cattle entry ports that allow a cow to insert only its head and neck into the feeder. The single cradle framework thereby serves the dual functions of supporting the enclosed forage and defining the direct interface between the cattle and the forage. In the preferred embodiment, the U-shaped ribs and the vertical bars are fabricated from standard nominal 1.5 inch diameter steel pipe, and all frame member connections are performed by welding. However, within the broader aspects of the present invention other tubing and different methods of connection can be used.

The U-shaped ribs give the framework a semi-cylindrical cross section that keeps the forage centered in the feeder as it is consumed. The ribs are also positioned to allow cattle to reach the bottom center of the cradle framework for complete forage or granular feed consumption.

In a further aspect of the present invention, a removable gate is provided for at least one end of the feeder that is easily removed and re-installed to allow hay bales and other forage to be laterally loaded into the feeder. The gate includes L-shaped brackets that permit the gate to be conveniently hung on the side of the framework during loading.

The feeder also includes a removable plastic floor sheet that flexes to conform to the curvature of the bottom of the cradle framework. With the floor sheet inserted, substantially crescent-shaped end walls abut each end of the sheet to form a trough for feeding granular feed, such as vitamin and mineral supplements. Advantageously, the floor sheet is easily removed for cleaning and does not add any appreciable weight to the feeder.

The entire framework is supported above the ground by a rectangular mounting platform. Two elongated support members extend the length of the feeder and are welded to the underside of each rib. Vertical connectors depend downwardly from each end of the support members and attach to parallel elongated skid pipes that rest on the ground. These connectors are joined at each end of the feeder by a cross bar extending across the feeder to provide additional stability to the platform.

The elevated platform advantageously keeps the enclosed forage/feed away from mud, manure and other ground-based debris or contaminants, and the skid pipes allow the feeder to be easily pushed or pulled to a desired location. The overall light-weight and compact construction of the feeder also allows it to be manually handled and moved by as few as two persons. Further, the spacing of the skids allows the feeder to fit into a standard pickup truck bed for convenient transport. The skids slide in between the wheel wells of the truck and the ribs slope above the bed side walls.

Still other objects of the present invention will become apparent to those skilled in this art form the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

FIG. 1 is a perspective view of a portable combination livestock feeder of the present invention showing the feeder with the removable floor sheet installed and the removable gate secured to the framework.

FIG. 2 is a perspective view of the feeder with the floor sheet being removed and showing the removable gate being hung with L-shaped hooks on the side of the feeder as a hay bale is loaded through the rear in the direction of the action arrow.

FIG. 3 is an end view of the feeder partially broken away and showing the floor sheet and abutting end wall at the rear forming a trough, and cattle feeding from each side of the feeder on bulk granular feed in the trough.

FIG. 4 is a perspective view of two of the feeders of the invention nested and stacked in the bed of a pickup truck for convenient transportation.

FIG. 5 is an enlarged broken away view of one corner of the feeder with the gate connecting means shown in detail including the Z-shaped connecting bar and the cooperating retaining pin and mating apertures.

FIG. 6 is an enlarged cut away section of the horizontal gate cross bar positioned and held in place above the lower cross member.

DETAILED DESCRIPTION OF THE DRAWINGS

Reference is now made to FIG. 1 and 2 of the drawings showing the preferred embodiment of an improved combination livestock feeder according to the present invention, and generally represented by the reference numeral 10. The feeder 10 is primarily adapted for supporting round hay bales, but also is convertible to function as a trough feeder, as is explained in more detail below.

The feeder 10 is comprised of a plurality of U-shaped ribs 12 that are spaced apart and arranged semi-cylindrically to form a cradle framework 11. The upper ends of the U-shaped ribs 12 are connected by elongated side members 14 that run the length of the framework 11. Preferably, the ribs 12 and side members 14 are fabricated from standard 1.5 inch diameter steel pipe and are connected by well-known welding techniques. It should be recognized, however, that the broader aspects of the present invention envision and encompass the use of other types and sizes of pipe and other materials, as well as different methods of connection.

As best seen in FIG. 2, four equally spaced, inner reinforcing members 18 extend perpendicular to the ribs 12 and run longitudinally over the full length of the framework 11; the reinforcing members being preferably fabricated of flat stock and attached at spaced radial locations along the bottom, inner peripheral portion of the framework. These reinforcing members 18 provide full longitudinal support for an enclosed round hay bale H, shown in the process of being loaded, preferably by sliding (see FIG. 2). The reinforcing members 18 combine with the ribs 12 to provide enhanced stability and structural integrity for the framework 11.

Located just above the opposing outer two reinforcing members 18 are parallel yoke rails 20 that similarly extend the length of the framework 11 and are affixed to the ribs 12 (see FIG. 3). These rails 20 combine with the ribs 12 and the side members 14 to define side entry ports 22 for cattle to gain access to the enclosed forage/feed. More specifically, each side entry port 22 is configured to allow one cow to insert its head and neck, but not its shoulders into the feeder. This controlled accessibility substantially eliminates fighting for position among the cattle and encourages orderly feeding. As also shown in FIG. 3, these rails 20 serve a centering function for the insert sheet 56 that holds the bulk granular feed.

As illustrated in FIG. 3, the curvature of the ribs 12 and the height of the yoke rails 20 allow the cattle C to reach the bottom center and all other interior points of the feeder 10. The cylindrical cross-section of the entire framework 11 also keeps the bale or granular forage centered in the feeder 10 as it is consumed. Advantageously, this total access to all of the enclosed feed along with the natural centering tendency of the framework 11 allows for complete cattle consumption of the forage/feed, thereby eliminating waste due to inaccessibility.

The ends of the feeder 10 are comprised of a front end frame means 24, and a rear end frame means that also functions as a removable gate 26. The front end frame means 24 includes parallel upper and lower cross members 28, 30 that are fixedly attached to the framework 11. The upper cross member 28 extends between the ends of the side members 14, while the lower cross member 30 extends between two points along the inner circumference of the adjacent rib 12. Connecting the upper and lower cross members 28, 30 are three vertical end bars 32.

Together, the upper and lower cross members 28, 30, the vertical end bars 32 and the adjacent rib 12 define two rectangular end entry ports 34 and two substantially quarter-circular end entry ports 34' for cattle access to the enclosed forage (see FIG. 1). At the rear of the feeder, the removable gate 26, discussed in more detail below, is similarly configured to provide two rectangular and two substantially quarter-circular end entry ports 34, 34'. Thus, the feeder 10 includes a total of sixteen side and end entry ports that allow the feeder to accommodate up to sixteen cattle at one time for efficient and orderly feeding. Of course, within the broader aspects of the invention, more or less feeding ports can be incorporated as needed or desired.

As the above discussion demonstrates, the single cradle framework 11 serves the dual functions of supporting the enclosed forage and defining the direct interface between the feeding cattle and the forage. By providing these features in a single frame design, the feeder 10 of the present invention has a more compact structure and uses fewer components than the double frame designs of the prior art. Not only does this simplified design reduce the materials and labor required in manufacturing, but it also reduces the weight of the feeder and improves its portability, as is discussed more fully below.

In another aspect of the present invention, the rear end frame means of the feeder 10 is releasably affixed to the cradle framework 11 so as to function as a removable gate 26. Advantageously, the removal of the gate 26 allows the feeder 10 to be conveniently loaded from the lateral direction; namely, through the open rear end once the gate 26 is removed. This eliminates the need for any special bale handling equipment to lift and lower the hay bale into the feeder through the top. Loading may thus be performed with a standard tractor, and standard attachments, such as a center bale fork.

Like the front end frame means 24, the removable gate 26 includes an upper cross member 28' extending between the parallel side members 14 (see FIG. 1). Three vertical end bars 32' depend downwardly from the upper cross member 28' and are fixedly attached to a gate cross bar 36. As illustrated by FIGS. 1 and 6, the gate cross bar 36 rests just above a lower cross member 30' that is fixedly attached to points along the inner periphery of the adjacent rib 12.

To keep the gate 26 securely in position when installed, two pairs of locating tabs 52 are affixed near each end of the gate cross bar 36. As shown in FIG. 6, the locating tabs 52 are attached on opposite sides of the gate cross bar 36 and extend downwardly to straddle the lower cross member 30' when the gate 26 is installed.

Advantageously, the locating tabs 52 keep the lower portion of the gate 26 in position over the lower cross member 30'. Additionally, these tabs provide for easy and quick installation and removal of the gate 26. By positioning the locating tabs 52 over the lower cross member 30', the gate 26 is easily pivoted upwardly about the second cross member 30'. Further, this method of installation/removal automatically guides the releasable attaching means 38, discussed immediately below, into the mating opening ends of the tubular side members 14.

Thus, the upper portion of the gate 26 is held in position on the framework 11 by a releasable attaching means 38 located at each lateral end of the upper cross member 28'. As shown in detail in FIG. 5, the preferred embodiment of the releasable attaching means 38 includes a Z-shaped bar 40 having first and second right angle flanges 42, 44. The first flange 42 is permanently affixed to the surface of the upper cross member 28'. The second flange 44 has a length slightly less than the inside diameter of the side member 14, such that the flange 44 can be inserted lengthwise into the side member 14 until the first flange 42 contacts the lip of the side member 14.

Aligned apertures 46 are drilled in the top and bottom of the side member 14 at a point just rearward of the flange 44 in its fully inserted position. The apertures 46 accept a drop-in pin 48 that functions as a stop to retain the second flange 44 inside the side member 14. The pin 48 also includes a retaining chain 50 that is attached to the side member 14 to insure that the pin 48 is not lost when the gate 26 is removed. Advantageously, with the second flange 44 fully inserted and the pin 48 engaged, the releasable attaching means 38 combines with the locating tabs 52 to securely affix the gate 26 to the framework 11.

Also included on the removable gate 26 is a means for temporarily hanging the gate on one of the side members 14 during loading and unloading. In the preferred embodiment the means for hanging comprises two L-shaped brackets 54 that are attached to the upper surface of the first cross member 28'. As best illustrated in FIG. 2, the L-shaped brackets 54 allow the gate 26 to hang on one of the side members 14 while a bale of hay H or other forage is being loaded. Advantageously, the gate 26 is kept conveniently close by and away from any mud, manure, and other unwanted ground matter.

In a further aspect of the present invention, a removable floor sheet 56 is provided that allows the feeder 10 to be converted into a trough. In the preferred embodiment the floor sheet 56 is fabricated from a flexible plastic material, such as polyvinyl chloride (PVC). As illustrated in FIGS. 1 and 3, the floor sheet 56 is rectangular in shape and bows downwardly to conform to the curvature of the bottom of the framework 11 when inserted. The bottom surface of the installed floor sheet 56 rests on the reinforcing members 18 and the edges of the sheet engage against the yoke rails 20 for centering.

To provide containment at each end of the trough, substantially crescent-shaped end walls 58 are permanently affixed to the lower cross member 30, 30' at each end of the framework 11. As best shown in FIG. 2, each end wall 58 includes four notches 60 that accept the four reinforcing members 18 and allow the end walls 58 to be securely seated. Preferably, the end walls 58 are also made of PVC plastic and are affixed to the lower cross members 30, 30' by any suitable fasteners, such as pop rivets (not shown).

Advantageously, the removable floor sheet 56 allows the feeder 10 to be quickly and easily converted into a trough for feeding bulk granular feed, such as concentrated and/or supplemental grain, minerals, vitamins, and/or other pelletized feed. Unlike the permanently installed floors and side walls of the prior art feeders, the removable floor sheet 56 can be taken out for easy cleaning. Further, the use of flexible plastic for the floor sheet 56 adds no appreciable weight to the feeder 10, and thus does not adversely affect portability.

As shown in FIGS. 1 and 2, the entire cradle framework 11 is supported by an elevated mounting platform 62. The ribs 12 are welded to elongated horizontal support members 64. At each end of both support members 64 are vertical connectors 68 that depend downwardly and attach to parallel elongated skid pipes 66. These vertical connectors 68 are themselves connected at each end of the feeder 10 by a cross bar 70 to provide additional stability to the mounting platform 62.

Advantageously, the mounting platform 62 keeps the enclosed hay or other forage above mud, manure, and other unsanitary ground conditions. Additionally, the front end of each skid pipe 66 is angled upwardly to allow the feeder 10 to be easily pushed or pulled to various locations. As shown in FIG. 2, a pull ring 72 is affixed to the rib 12 at the front of the feeder 10 to allow for easy towing. Further, in an important aspect of the present invention, the spacing of the skid pipes 66 along with the elevation of the cradle framework 11 allow the feeder to fit into the bed of a standard pickup truck T for convenient transportation (see FIG. 4). More particularly, the skid pipes 66 are spaced approximately 47 inches apart and the vertical connectors 68 are approximately 19 inches high to give the platform 62 an approximate height of 19 inches. This spacing allows the skid pipes 66 to slide in between the wheel wells of the pickup truck T and allows the ribs 12 to slope above the side walls of the truck bed.

Advantageously, by providing for transportation in a pickup truck, the feeder 10 can be taken to remote locations and through rough and rugged terrain over which the feeder could not be towed. Additionally, as illustrated in FIG. 4, the design of the present invention allows the feeder 10 to be nested and stacked in a truck bed with the gate 26 removed, so that several feeders can be transported in one trip. Further, the overall compact construction and generally manageable weight of the feeder 10 allow it to be manually handled and moved by as few as two persons.

In summary, the feeder 10 exhibits features and advantages not heretofore available in a single or double frame design. The cradle framework 11 both supports the enclosed forage and functions as the direct interface with the feeding cattle, thereby eliminating the need for a separate outer framework. The configuration of the framework 11 also allows for complete cattle access to the enclosed forage to eliminate waste. The removable floor sheet 56 easily converts the feeder 10 into a trough and the gate 26 allows for convenient lateral loading. Additionally, the overall compact construction of this feeder/platform enhances its portability and provides for easy handling.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. A portable combination livestock feeder primarily for a horizontally positioned round hay bale, comprising:

a plurality of U-shaped ribs being spaced apart to form a cradle framework providing full longitudinal support for said bale;

two elongated side members extending along the length of said framework and connecting the ends of said U-shaped ribs;

front and rear end frame means enclosing said framework and forming a single enclosure; and a mounting platform for supporting said enclosure above ground, whereby said single enclosure functions both as a support structure for the enclosed bale and as a direct interface for the feeding livestock.

2. The feeder as set forth in claim 1, wherein each of said front and rear end frame means comprises:

an upper cross member extending between said side members and said ends of one of said ribs;

a lower cross member disposed parallel to and below said upper cross member and extending between opposing points along the inner circumference of said one of said ribs; and a plurality of vertical end bars extending between said upper and lower cross members, whereby said front and rear end frame means define a plurality of end entry ports that permit controlled cattle access to the enclosed forage for efficient and orderly feeding.

3. The feeder as set forth in claim 1, wherein said front end frame means is permanently affixed to said framework.

4. The feeder as set forth in claim 1, wherein said rear end frame means is removable and releasably secured to said framework, whereby said rear end frame means functions as a gate that allows a hay bale to be loaded laterally into said feeder.

5. The feeder as set forth in claim 4, further including a hanging means for releasably securing said rear end frame means on said framework during loading and unloading.

6. The feeder as set forth in claim 5, wherein said hanging means comprises at least one L-shaped bracket attached to said upper cross member of said rear end frame means.

7. The feeder as set forth in claim 1, wherein said cradle framework includes two elongated neck yoke bars extending along the length of said framework and being attached to the inner circumference of said ribs below said side members, whereby said framework defines a plurality of side entry ports that permit controlled cattle access to the enclosed forage for efficient and orderly feeding.

8. The feeder as set forth in claim 1, further including a removable flexible floor sheet being disposed across the bottom inner circumference of said framework and being flush with the curvature of said framework, whereby said feeder may be converted into a trough for accommodating granular feed.

9. The feeder as set forth in claim 8, wherein said floor sheet is fabricated from a flexible plastic material.

10. The feeder as set forth in claim 1, wherein said mounting platform includes parallel elongated skid pipes that allow said feeder to be conveniently pushed or pulled to different locations.

11. The feeder as set forth in claim 10, wherein the spacing between said skid pipes and the height of said platform allow said feeder to fit into the bed of a standard pickup truck for convenient transportation.

12. The feeder as set forth in claim 11, wherein said spacing between said skid pipes is approximately 47 inches and said height of said platform is approximately 19 inches.

* * * * *